US008694956B2

(12) United States Patent
Pasternak

(10) Patent No.: US 8,694,956 B2
(45) Date of Patent: Apr. 8, 2014

(54) POWERSHELL CMDLETS CODE GENERATING TOOL FOR COMMUNICATING TO THE WEB SERVICES

(75) Inventor: Michael Pasternak, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 220 days.

(21) Appl. No.: 12/904,423

(22) Filed: Oct. 14, 2010

(65) Prior Publication Data

US 2012/0096527 A1    Apr. 19, 2012

(51) Int. Cl.
G06F 9/44 (2006.01)
G06F 3/00 (2006.01)
G06F 15/16 (2006.01)

(52) U.S. Cl.
USPC ........... 717/106; 719/328; 719/330; 719/311; 709/217; 709/218; 709/219; 709/201

(58) Field of Classification Search
USPC .......... 717/106, 100, 101, 706; 709/203, 202, 709/222, 219; 719/328, 219, 330
See application file for complete search history.

(56) References Cited

U.S. PATENT DOCUMENTS 7,617,479 B2 * 11/2009 Hambrick et al. ............ 717/104
8,260,845 B1 *  9/2012 Colton et al. ................. 709/203
8,266,202 B1 *  9/2012 Colton et al. ................. 709/203
2006/0150200 A1 * 7/2006 Cohen et al. .................. 719/328
2008/0016143 A1 * 1/2008 Bumpus et al. ............... 709/203
2009/0125822 A1 * 5/2009 Karatal et al. ................ 715/762

OTHER PUBLICATIONS

Timothy Budd, "The design of Object Oriented Command Interpreter", Oregon State University, 1987.*

* cited by examiner

Primary Examiner — Joseph Avellino
Assistant Examiner — Aftab Nasir Khan
(74) Attorney, Agent, or Firm — Lowenstein Sandler LLP

(57) ABSTRACT

An objected oriented shell code generating tool receives data that identifies a Web service hosted by a server. The tool creates proxy code to generate a Web service client proxy to identify a plurality of methods for the Web service. For each method, the tool automatically creates object driven shell commands code that defines a class implementing parameters of the Web service method, wherein the object driven shell commands code is to be executed in an object driven shell platform to communicate with the Web service method via the client proxy. The tool generates invocation infrastructure code for communicating to the Web service method via the client proxy and deploys the proxy code, the invocation infrastructure code, and the object driven shell commands code in the object driven shell platform on the client to call a Web service method via the invocation infrastructure and the client proxy.

18 Claims, 7 Drawing Sheets

POWERSHELL CMDLETS CODE GENERATING TOOL FOR COMMUNICATING TO THE WEB SERVICES

TECHNICAL FIELD

Embodiments of the present invention relate to Web services. Specifically, the embodiments of the present invention relate to automatically generating object driven shell commands code (e.g., cmdlets code) for communicating with a Web service from an object driven shell platform (e.g., PowerShell™ platform).

BACKGROUND

Software frameworks, such as the Microsoft® .NET framework, can include a large library of coded solutions to common programming problems. The framework's library provides a large range of features including user interface, web application development, etc. Users, such as software developers and administrators, combine their own code with the framework class library (e.g., .NET class library) to produce applications.

Various object driven shell platforms, such as Windows® PowerShell™, consists of a command-line shell and associated scripting language built on top of, and integrated with, the software framework (e.g., .NET Framework). An object driven shell platform can execute shell commands (e.g., PowerShell™ cmdlets), return results as objects, and can provide full access to Component Object Model (COM) and Windows Management Instrumentation (WMI), enabling users to perform administrative tasks on both local and remote Windows® systems. An object driven shell platform (e.g., PowerShell™) can also provide a hosting mechanism with which the runtime (e.g., PowerShell™ runtime) can be embedded inside other applications. These applications can then leverage the object driven shell platform functionality to implement certain operations.

Web services are distributed computing technology that allow users to create client and server applications. A software framework can include a set of capabilities in products that enables people, information, systems, and devices to connect and exchange information seamlessly through the use of Web services. For example, the .NET Framework can provide Web service proxy objects that represent the Web service as a .NET Framework object. Web services are typically application programming interfaces (API) that may be accessed, for example, via SOAP (Simple Object Access Protocol) and executed on a remote system hosting the requested service. Many companies rely on Web services for their enterprise applications. For example, a company may provide a virtualization environment and have system administrators and technical staff to maintain the virtualization environment. Service providers, such as for virtualization management services, can provide virtualization management Web service methods to allow system administrators and technical staff the management functionality to maintain their virtualization environment. For example, the system administrators can use the virtualization management Web services to backup particular virtual machines and restart the virtual machines once a backup is complete.

Software developers, system administrators, and/or technical staff, for example, for a company that provides a virtualization environment, can use an object driven shell platform, such as PowerShell™, to utilize virtualization management Web services. Traditionally, a company would hire and manage one or more software developers to manually write code to communicate to a Web service and to create the object driven shell platform commands code (e.g., as cmdlets) for all of the methods in the Web service. Such projects can take a significant amount of time to develop and manage a team of software developers, especially when a company uses a large number of Web services (or Web service end points) provided by different service providers.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
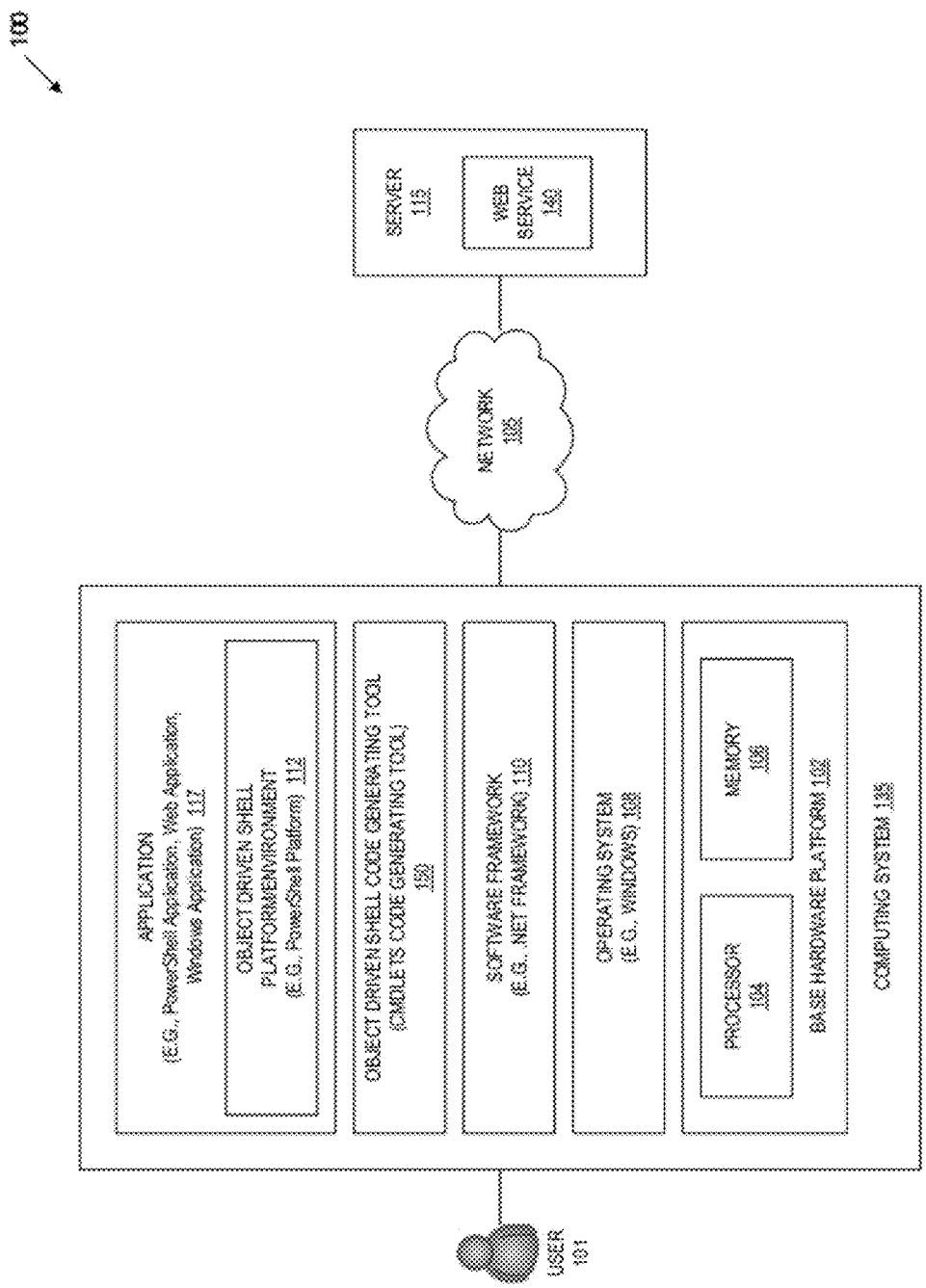
FIG. 1 is an exemplary network architecture in which embodiments of the present invention may operate.

Embodiments of the invention are directed to a method and system for automatically generating object driven shell commands code (e.g., as cmdlets) to be executed in an object driven shell platform for communicating to a Web service using an objected driven shell code generating tool. The object driven shell commands code can be executed in an object driven shell platform to communicate to the Web service via an invocation infrastructure and a Web service client proxy. An objected oriented shell code generating tool receives data that identifies a Web service hosted by a server. The tool creates proxy code for the Web service and executes the proxy code to generate a Web service client proxy to identify a plurality of methods for the Web service. For each Web service method, the tool automatically creates object driven shell commands code (e.g., as cmdlets) that defines a class implementing parameters of the Web service's method, wherein the object driven shell commands code is to be executed in an object driven shell platform to communicate with the Web service method via the client proxy. The tool generates invocation infrastructure code for communicating to the Web service method via the client proxy. The Web service proxy code, the invocation infrastructure code, and the object driven shell commands code can be deployed in the object driven shell platform, wherein execution of the proxy code, the invocation infrastructure code, and the object driven shell commands code in the object driven shell platform, and invocation of an object driven shell command in the object driven shell platform, calls a Web service method via the invocation infrastructure and the client proxy.

Object driven shell platforms, such as Windows® PowerShell™, can execute object driven shell commands to implement a particular operation. An example of an object driven shell command is a PowerShell™ command-let ("cmdlet"), which is a specialized class (e.g., .NET class), for PowerShell™ to implement an operation. An example of object driven shell commands code is PowerShell™ cmdlets code (hereinafter also referred to as 'cmdlets code'). For brevity and simplicity, PowerShell™ platform, PowerShell™ Script, Microsoft® .NET Framework, and Microsoft® Windows® are used as examples throughout this document. Traditionally, software developers manually write cmdlets code to use a Web service client proxy to communicate to a Web service. Such projects can take a significant amount of time to develop and maintain. Embodiments of the present invention are used to improve software development by employing an object driven shell code generating tool (e.g., cmdlets code generating tool) that automatically generates and compiles Web service object driven shell code (e.g., proxy code, invocation infrastructure code, and object driven shell commands code, such as cmdlets code) to be deployed in an object driven shell platform (e.g., PowerShell™). The PowerShell™ platform can execute the Web service proxy code, invocation infrastructure code, and cmdlets code, and create cmdlets to communicate with Web service methods on a server via an invocation infrastructure and a Web service client proxy.

FIG. 1 is an exemplary network architecture 100 in which embodiments of the present invention can be implemented. The architecture 100 includes one or more servers 115 that host one or more Web services 140 that are accessible by one or more computing systems 135 using network 105. A server 115 can be any type of computing device including server computers, desktop computers, laptop computers, gateway computers, or similar computing device. A computing system 135 can be a client computer such as desktop computers, laptop computers, mobile communications devices, cell phones, smart phones, hand-held computers or similar computing device, a server computer, a gateway computer, etc. An exemplary computer system is described in greater detail below in conjunction with FIG. 7. The network 105 can be a public network (e.g., Internet) or a private network (e.g., a local area network (LAN)).

A server 115 can provide one or more Web services 140. Web services 140 are a distributed computing technology that allows a user 101, such as software developers, system administrators, technical staff, etc., to create client and server applications. Web services 140 are typically application programming interfaces (API) or web APIs that may be accessed, for example, via SOAP (Simple Object Access Protocol) and executed on a remote system hosting the requested service. Web services 140 include methods (functions) to be executed on a server 115 and can return a result to a requesting system, such as the computing system 135. For example, the server 115 can provide Web services 140 for virtualization system management functionalities, such as Web service methods for selecting particular virtual machines (e.g., method 'SelectVirtualMachine'), starting virtual machines (e.g., method 'StartVirtualMachine'), stopping virtual machines (e.g., method 'StopVirtualMachine'), backing up virtual machines (e.g., method 'Backup VirtualMachine'), etc. For instance, the Web service 140 can perform a method SelectVirtualMachine using a host name 'vy.com' as a parameter and return a list of the virtual machines running on the host vy.com to the requesting system.

Many companies may rely on Web services 140 for their enterprise applications. For example, a company may maintain a virtualization environment and have users 101, such as system administrators and technical staff, to maintain the virtualization environment. The users 101 can use a computing system 135 to communicate with a server 115 that provides Web services 140 for virtualization system management functionalities to help maintain their virtualization environment. Traditionally, a user 101 manually writes cmdlets code to use a client proxy to communicate with a Web service 140 and a software framework 110 compiler (e.g., .NET compiler) generates Common Intermediate Language (CIL) code (also known as Microsoft Intermediate Language or MSIL) for the cmdlets code. Typically, a company invests a significant amount of time and resources in hiring and managing a team of software developers to create and maintain the PowerShell™ cmdlets solution(s).

Computing system 135 can include an object driven shell code generating tool 150 for automatically generating code to reduce the amount of resources and costs a company would typically allocate for such a project. For brevity and simplicity, an object driven shell code generating tool 150 is hereinafter referred to as a cmdlets code generating tool 150. Examples of code generated by a cmdlets code generating tool 150 can include, and are not limited to, Web service client proxy code, object driven shell commands code (e.g., cmdlets code), and invocation infrastructure code. The cmdlets code generating tool 150 can generate the code as assemblies. Assemblies are the building block of framework applications (e.g., .NET Framework). An assembly is a partially compiled code library for use in deployment, versioning, and security. One type of assembly is library assemblies (dll). The cmdlets code generating tool 150 can generate a proxy dll, a shell commands container dll, and an invocation dll. For brevity and simplicity, a shell commands container dll is hereinafter referred to as a 'snapin dll'.

The user 101 can install (deploy) the automatically generated proxy dll, snapin dll, and invocation dll in an object driven shell platform, such as a PowerShell™ platform 112 and execute the installed PowerShell™ cmdlets in a runtime engine (e.g., PowerShell™ runtime) of the PowerShell™ platform 112 on the computing system 135 for calling Web service 140 methods hosted by a server 115 using an invocation infrastructure running on the computing system 135 and a Web service client proxy running on the computing system 135.

The computing system 135 can include a base hardware platform 102 that comprises a computing platform, which may be capable, for example, of working with a standard operating system 108 (e.g., Microsoft® Windows®, Linux®, etc.). Operating system 108 serves as an interface between hardware or physical resources of the computing system 135 and a software framework 110 (e.g., Microsoft® .NET Framework). In some embodiments, base hardware platform 102 may include a processor 104, memory devices 106, network devices, drivers, and so on.

Software framework 110 may provide features (e.g., user interface, database connectivity, network communication, etc.) to address common programming problems and a virtual machine to manage the execution of software programs written for the software framework 110. An object driven shell platform or environment 112 (e.g., Windows® Power- Shell™) is built on software framework 110 and includes a runtime engine, an interactive prompt, and object driven shell commands (e.g., PowerShell™ cmdlets). The object driven shell platform 112 may include an extensible automation engine that includes a command-line shell and a corresponding execution scripting language, such as PowerShell™ script.

The PowerShell™ platform 112 is built on software framework 110 and can provide an environment for a user 101 (e.g., software developers/administrators) to install and execute the proxy assembly (e.g., proxy dll), shell commands container assembly (e.g., snapin dll), and invocation infrastructure assembly (e.g., invocation dll) that is automatically generated and compiled by the cmdlets code generating tool 150. A PowerShell™ runtime can be hosted in an application 117, such as a PowerShell.exe, a Web application, a Windows application, etc.

Figure 2:
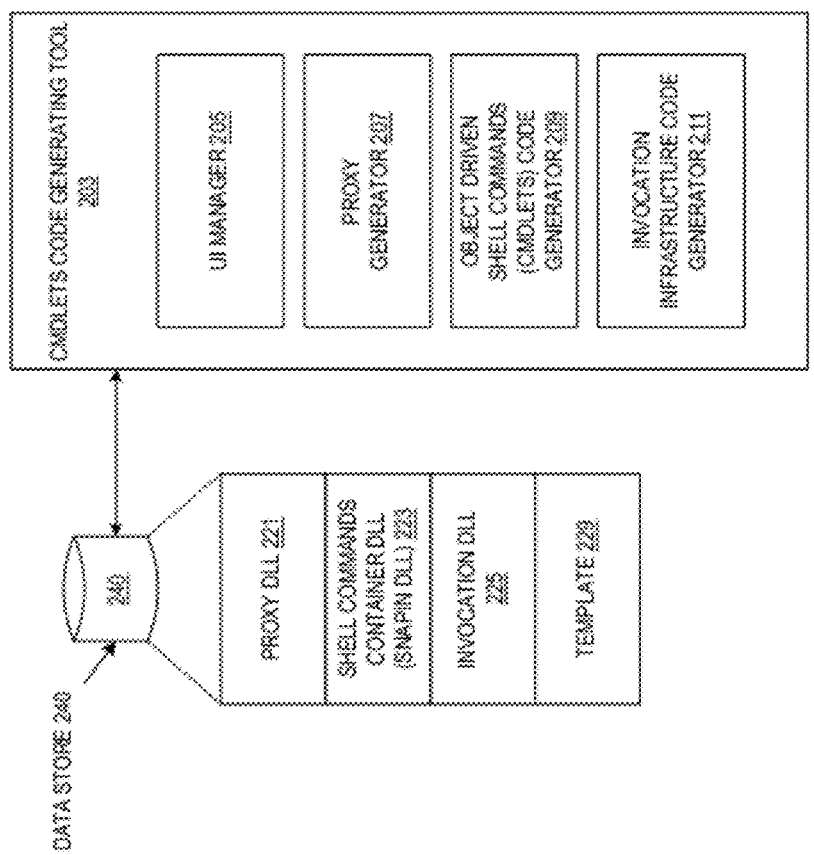
FIG. 2 is a block diagram of one embodiment of an object driven shell code generating tool for automatically generating proxy code, invocation infrastructure code, and object driven shell commands code (e.g., as cmdlets) to be executed in an object driven shell platform for communicating to a Web service.

FIG. 2 is a block diagram of one embodiment of a cmdlets code generating tool 203 for automatically generating and compiling proxy code (e.g., proxy dll), object driven shell commands code (cmdlets code, such as a snapin dll), and invocation infrastructure code (e.g., invocation dll) to be executed in a PowerShell™ platform for communicating to a Web service. The cmdlets code generating tool 203 may be the same as the cmdlets code generating tool 150 hosted by the computing system 135 of FIG. 1. The cmdlets code generating tool 203 can include a user interface (UI) manager 205, a proxy generator 207, an object driven shell commands code generator (e.g., cmdlets code generator 209), and an invocation infrastructure code generator 211.

The cmdlets code generating tool 203 can receive user input that identifies a Web service, such as a URL for the Web service. The UI manager 205 can generate and present a user interface (UI) to a user, such as a software developer and/or administrator, to receive user input. The UI can be a graphical user interface (GUI). The user input can include data that identifies a Web service (e.g., a URL) and user credentials to allow the tool 203 to login to a Web service. The GUI can be displayed on an output device, such as a display device.

The cmdlets code generating tool 203 can use the user input to automatically generate proxy code (e.g., proxy dll), object driven shell commands code (cmdlets code, such as a snapin dll), and invocation infrastructure code (e.g., invocation dll) in response to receiving the user input. The proxy generator 207 can use the user input (e.g., URL) to automatically generate client proxy code that defines a Web service client proxy for the identified Web service. The proxy generator 207 can create client proxy code, such as an object (e.g., a dynamic link library), which when executed is a proxy representing a Web service. A dynamic link library (dll) is a collection of small programs, which can be called upon when needed by the tool 203. For example, the proxy generator can create proxy code (e.g., a proxy dll 221) that contains a set of methods that point to the methods of a Web service, and arguments for the methods. When the proxy code is executed, the proxy can communicate with a Web service for an exchange of information. One embodiment of creating a Web service proxy is described in greater detail below in conjunction with FIG. 3. The proxy generator 207 can store the proxy code (e.g., proxy dll 221) in a data store 240 that is coupled to the tool 203. A data store 240 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The cmdlets code generator 209 can automatically create object driven shell commands code (cmdlets code), such as a shell commands container dll 223 (snapin dll 223) in response to receiving the user input (e.g., URL) and using the proxy code (e.g., proxy dll 221). The cmdlets code generator 209 can create an assembly (e.g., .NET assembly). One type of assembly is library assemblies (dll). The cmdlets code generator 209 can create an empty dll file (e.g., snapin dll 223) as the assembly for the Web service and a module for the assembly. The cmdlets code generator 209 can include code in the snapin dll 223 to point the snapin dll 223 to an invocation infrastructure (e.g., invocation dll 225). The invocation infrastructure (invocation dll 225) is a program that can communicate with the Web service client proxy.

The cmdlets code generator 209 can invoke a client proxy (e.g., proxy dll 221) and automatically create a snapin dll 223, that contains, for example, cmdlets for the methods in the proxy. The cmdlets code generator 209 can run a proxy dll 221 for an identified Web service, connect to and login to the Web service proxy, identify the Web service methods in the proxy, and create the object driven shell commands code (e.g., as cmdlets) for the methods in the proxy. The object driven shell commands code defines a class implementing a Web service method usage. Cmdlets are specialized .NET classes implementing a particular operation and follow a <verb>-<noun> naming pattern, such as 'start-service', and 'select-string', to help make a cmdlet self-descriptive. Cmdlets output their results as objects and can optionally receive input in that form, making them suitable for use as recipient in a pipeline.

For example, the cmdlets code generator 209 can identify that the client proxy contains the methods SelectVirtualMachine, StartVirtualMachine, Stop VirtualMachine, and BackupVirtualMachine. The cmdlets code generator 209 can create object driven shell commands code (e.g., as cmdlets) for the methods. For example, the cmdlets code generator 209 creates cmdlets code for a select-vm cmdlet, a start-vm cmdlet, a stop-vm cmdlet, and a backup-vm cmdlet. One embodiment of automatically generating cmdlets for methods in a proxy is described in greater detail below in conjunction with FIG. 4. The cmdlets code generator 209 can also generate Common Intermediate Language (CIL) instructions (also known as Microsoft Intermediate Language or MSIL) for the object driven shell commands (e.g., PowerShell™ cmdlets). Framework applications, such as the .NET framework, can conform to Common Language Infrastructure (CLI) to provide a language neutral platform for application development. Typically, during compilation of .NET programming languages, source code is translated into CIL code rather than platform or processor-specific object code. CIL is a CPU- and platform-independent instruction set that can be executed in any environment supporting the CLI. .NET assemblies contain code in CIL for the .NET runtime tool to execute at runtime. Embodiments of the invention can perform the functionality of a compiler by generating the CIL code (CIL instructions) for the object driven shell commands code.

The cmdlets code and the CIL instructions can be contained in the shell commands container dll (snapin dll) 223 (e.g., PowerShell™ snap-in). An PowerShell™ snap-in is a dynamic link library that implements PowerShell™ cmdlets. The shell commands container dll 223 (snapin dll) can contain a set of PowerShell™ cmdlets that correspond to the methods for the Web service in the proxy dll 221. For example, the cmdlets code generator 209 automatically generates cmdlets code for a select-vm cmdlet, a start-vm cmdlet, a stop-vm cmdlet, and a backup-vm cmdlet and stores the cmdlets in a virtualization management shell commands container dll 223 (snapin dll). One embodiment of automatically generating object driven shell commands code (e.g., cmdlets code) that defines classes implementing Web service method usage is described in greater detail below in conjunction with FIG. 4. The shell commands container dll 223 (snapin dll) can be stored in the data store 240. Subsequently, the assembly (e.g., snapin dll) can be deployed in a PowerShell™ platform and executed in a PowerShell™ runtime.

The invocation infrastructure code generator 211 can automatically generate invocation infrastructure code which is to be installed in an objected driven shell platform, such as PowerShell™, and executed by a runtime engine of the object driven shell platform, such as a PowerShell™ runtime, for communicating with a client proxy. The cmdlets code generator 209 can use templates 229 that are stored in the data store 240 to generate the invocation infrastructure code. When the invocation infrastructure code and proxy code is executed, for example, in PowerShell™, the invocation infrastructure can communicate with the client proxy to identify a method in the client proxy that corresponds to a PowerShell™ cmdlet and call the corresponding method using the client proxy and pass it arguments specified in a command (such as a PowerShell™ cmdlet). The invocation infrastructure code can be contained in an object, such as an invocation dll 225.

Figure 3:
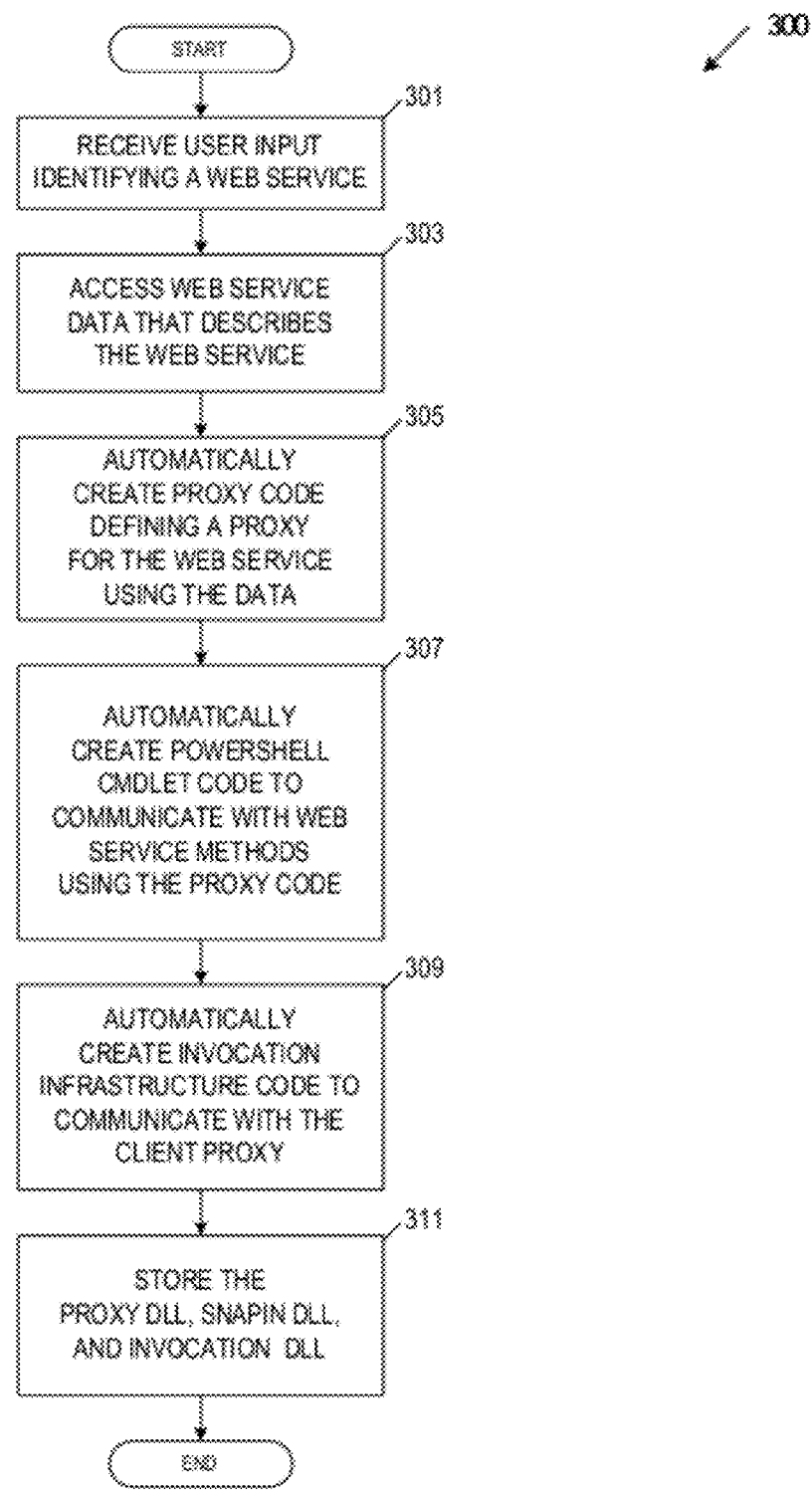
FIG. 3 is a flow diagram of an embodiment of a method for automatically generating proxy code, invocation infrastructure code, and object driven shell commands code (e.g., as cmdlets) to be deployed and executed in an object driven shell platform for communicating to a Web service.

FIG. 3 is a flow diagram of an embodiment of a method 300 for automatically generating object driven shell code (e.g., proxy code, cmdlets code, and invocation infrastructure code) for deployment and execution in an object driven shell platform (e.g., PowerShell™) for communicating to a Web service. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the cmdlets code generating tool 150 hosted by a computing system 135 of FIG. 1.

The tool can receive user input that identifies a Web service, such as a universal resource locator (URL) for the Web service, and automatically generate proxy code (e.g., proxy dll), cmdlets code (e.g., snapin dll), and invocation infrastructure code (e.g., invocation dll) in response to receiving the user input. In one embodiment, the method 300 starts with the tool receiving user input that identifies the Web service at block 301. The tool can present a graphical user interface (GUI) to a user to receive user input. The user input can be a URL and can also include user credentials to allow the tool to login to a Web service proxy. In another embodiment, the tool can communicate with a UDDI registry hosted by a server and request the registry to identify a Web service provider for a particular service. The UDDI registry server can identify the server(s) that provide the particular Web service requested by the tool.

At block 303, the tool accesses data, such as a Web Services Description Language (WSDL) file, also known as a WSDL, that describes the Web service based on the user input that identifies the Web service. A WSDL is a document written in XML and can be published by a Web service administrator using a URL. The WSDL specifies the location of the Web service, the operations (methods) the Web service exposes, and defines how to communicate with the Web service. The tool can access the WSDL file, for example, by executing a WSDL query, and can read the WSDL to determine how to communicate with the Web service server.

At block 305, the tool uses the data, for example, in the WSDL file, to create code (e.g., proxy dll) that defines a proxy for the Web service. The tool can identify the methods of a Web service from the WSDL file and create proxy code for the methods. The proxy code (e.g., proxy dll) contains a set of methods, which point to the Web service methods on a remote server hosting the Web service, and method arguments. For example, a remote server hosts a virtualization management Web service. An administrator for the virtualization management Web service provides a WSDL, that describes the methods of the virtualization management Web service, at a URL. The tool determines from the WSDL that the virtualization management Web service has a SelectVirtualMachine method, a StartVirtualMachine method, a StopVirtualMachine method, and a BackupVirtualMachine method. The tool creates proxy code (e.g., a proxy dll) that defines a proxy for the virtualization management Web service and contains the SelectVirtualMachine method, StartVirtualMachine method, StopVirtualMachine method, and BackupVirtualMachine method. In one embodiment, the tool can use a utility, such as wsdl.exe, in the .NET Framework to generate the proxy code.

At block 307, the tool automatically creates object driven shell commands code, such as cmdlets code (e.g., snapin dll) that defines classes that implements the Web service methods' parameters using the proxy code (e.g., proxy dll). One embodiment of automatically creating a snapin dll for using a client proxy to communicate with Web service methods is described in greater detail below in conjunction with FIG. 4. The cmdlets code can be contained in, for example, a shell commands container dll (also referred to as a snapin dll), which is to be deployed in a PowerShell™ platform and executed by a PowerShell™ runtime. For example, a snapin dll can contain a set of PowerShell™ cmdlets that correspond to the methods for the Web service in the client proxy.

At block 309, the tool automatically generates invocation infrastructure code (e.g., invocation dll) for communicating with the Web service client proxy to invoke a Web service method hosted by a server. The invocation infrastructure code can be contained in an invocation dll and is to be accessible by an object driven shell runtime, such as PowerShell™ runtime. The tool can use scripts and/or templates that are stored in the data store to generate the invocation infrastructure code. When executed in PowerShell™, the proxy code runs a Web service client proxy that can communicate with the Web service over a network and the invocation infrastructure code (e.g., invocation dll) runs an invocation infrastructure that can communicate with the client proxy.

At block 311, the tool stores the object driven shell code (e.g., proxy dll, the snapin dll, and the invocation dll). The proxy dll, snapin dll, and invocation dll can be stored in a data store that is coupled to the tool. In turn, the proxy dll, snapin dll, and invocation dll can be deployed in an objected driven shell platform, such as PowerShell™ and executed by a PowerShell™ runtime for communicating with Web service methods using an invocation infrastructure and a client proxy. For example, a user (e.g., system administrator, technical staff) can provide a URL of a Web service, such as a virtualization management Web service, to a cmdlets code generating tool. The tool can automatically generate object driven shell code for the virtualization management Web service, such as proxy code (e.g., a proxy dll), cmdlets code (e.g., a snapin dll), and invocation infrastructure code (e.g., an invocation dll). The snapin dll can also include CIL instructions.

The user can deploy the object driven shell code (e.g., proxy dll, snapin dll, and invocation dll) in a repository accessible by a PowerShell™ platform and invoke the dlls in a PowerShell™ runtime. The proxy dll can represent a client proxy for a virtualization management Web service and can communicate with the virtualization management Web service. For example, the client proxy can include a SelectVirtualMachine method, a StopVirtualMachine method, a BackupVirtualMachine method, and a StartVirtualMachine method. The snapin dll can include a select-vm shell command (e.g., select-vm cmdlet), a stop-vm shell command (e.g., stop-vm cmdlet), a backup-vm shell command (e.g., backup-vm cmdlet), a start-vm shell command (e.g., start-vm cmdlet). When executed in the PowerShell™ runtime, the invocation infrastructure code (e.g., invocation dll) can communicate with the client proxy in a bidirectional manner to locate relevant a method, pass a command's (e.g., PowerShell™ cmdlet) arguments to the client proxy, and return a web method response to the object driven shell.

Figure 5:
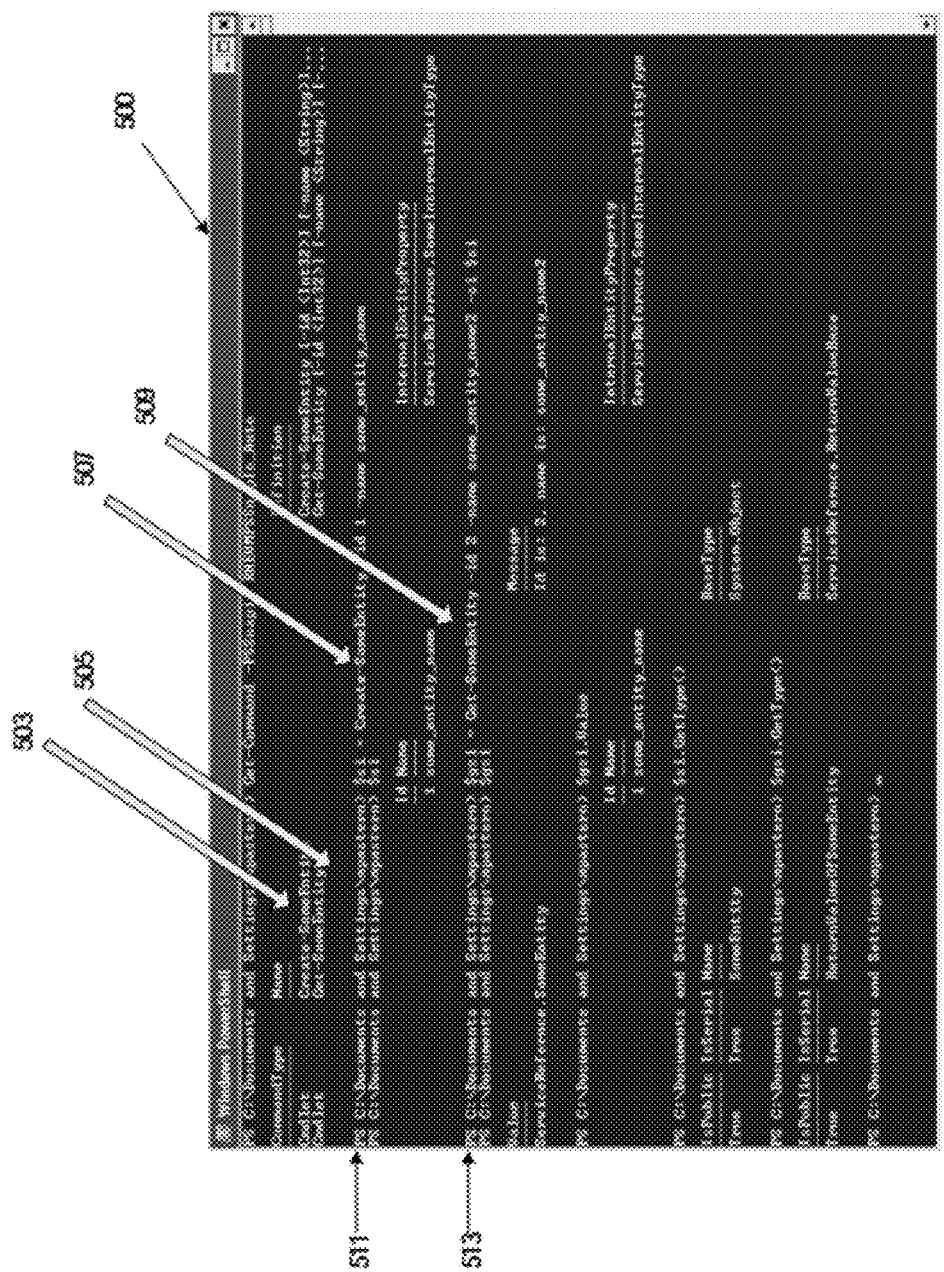
FIG. 5 illustrates an exemplary an object driven shell platform command line interface, according to one embodiment of the invention.

When the snapin dll is executing in the PowerShell™ runtime, an object driven shell platform CLI (command line interface), such as a PowerShell™ console, can present the object driven shell commands (e.g., cmdlets) to a user. FIG. 5 illustrates an exemplary an object driven shell platform CLI 500, according to one embodiment of the invention. Cmdlets are specialized .NET classes implementing a particular operation and follow a <verb>-<noun> naming pattern, such as Create-SomeEntity 503 and Get-SomeEntity 505, to help make a cmdlet self-descriptive. Cmdlets output their results as objects and can optionally receive input in that form, making them suitable for use as recipient in a pipeline. Cmdlet Create-SomeEntity 503 and cmdlet Get-SomeEntity 505 are presented to a user. A user can select a cmdlet to execute and can provide the arguments for the cmdlet. The CLI 500 receives user input 511 that invokes the Create-SomeEntity 507 verb (e.g., 'Create') to create an object result stored at $si variable. The CLI 500 also receives user input 513 that invokes the Get-SomeEntity 509 verb (e.g., 'Get') with primitives and the object that was previously created (e.g., $si).

Alternatively, a user can write a script to be executed in PowerShell™ that includes object driven shell commands, such as a script including 'select-vm("host=vy.com")|stop-vm|backup-vm|start-vm.' PowerShell™ can execute the script to call the corresponding Web service methods on a server using the invocation infrastructure and the client proxy executing in PowerShell™.

For example, when a script, which includes 'select-vm("host=vy.com")|stop-vm|backup-vm|start-vm,' is executed in PowerShell™, the invocation infrastructure identifies the methods in the Web service client proxy that correspond to the object driven shell commands (e.g., select-vm shell command, stop-vm shell command, backup-vm shell command, start-vm shell command). The invocation infrastructure can call the matching methods using the client proxy. The invocation infrastructure invokes methods on a proxy, such as SelectVirtualMachine, StopVirtualMachine, BackupVirtualMachine, StartVirtualMachine, which correspond to the PowerShell™ cmdlets and any parameters for the PowerShell™ cmdlets (e.g., host=vy.com for the select-vm shell command), passed to the Web service using the client proxy.

The client proxy invokes the methods (e.g., SelectVirtualMachine) on a server and passes the parameters (e.g., host=vy.com) to the virtualization management Web service on the server. Web services can be communicated with over a network using industry standard protocols for exchanging structured information, such as the Simple Object Access Protocol (SOAP). The proxy can create and send messages, such as SOAP messages, to a Web service and receive messages from the Web service. The client proxy can connect to the Web service and forward data (e.g., method name, method arguments) pertaining to the called method to the Web service. The client proxy can communicate with a Web service over a network by processing the, messages, such as SOAP messages, sent to and from the Web service to invoke the Web service method. The client proxy can encapsulate input and output parameters (arguments) received from a user to XML elements and then send the SOAP messages over a network.

The Web service can perform the methods using the parameters (e.g., perform the method SelectVirtualMachine using the parameter hostname "vy.com"). The Web service can return a response to the client proxy, such as list of the virtual machines running the host vy.com. The response can be in the form of a SOAP message. The proxy can unencapsulate the received result and forward it to the invocation infrastructure, which can provide the response to PowerShell™. PowerShell™ can also pipe the result as input for another method. For example, PowerShell™ can pipe the list of the virtual machines running the host vy.com as input to others method that are to be performed, such as Stop VirtualMachine, Backup VirtualMachine, and StartVirtualMachine.

Figure 4:
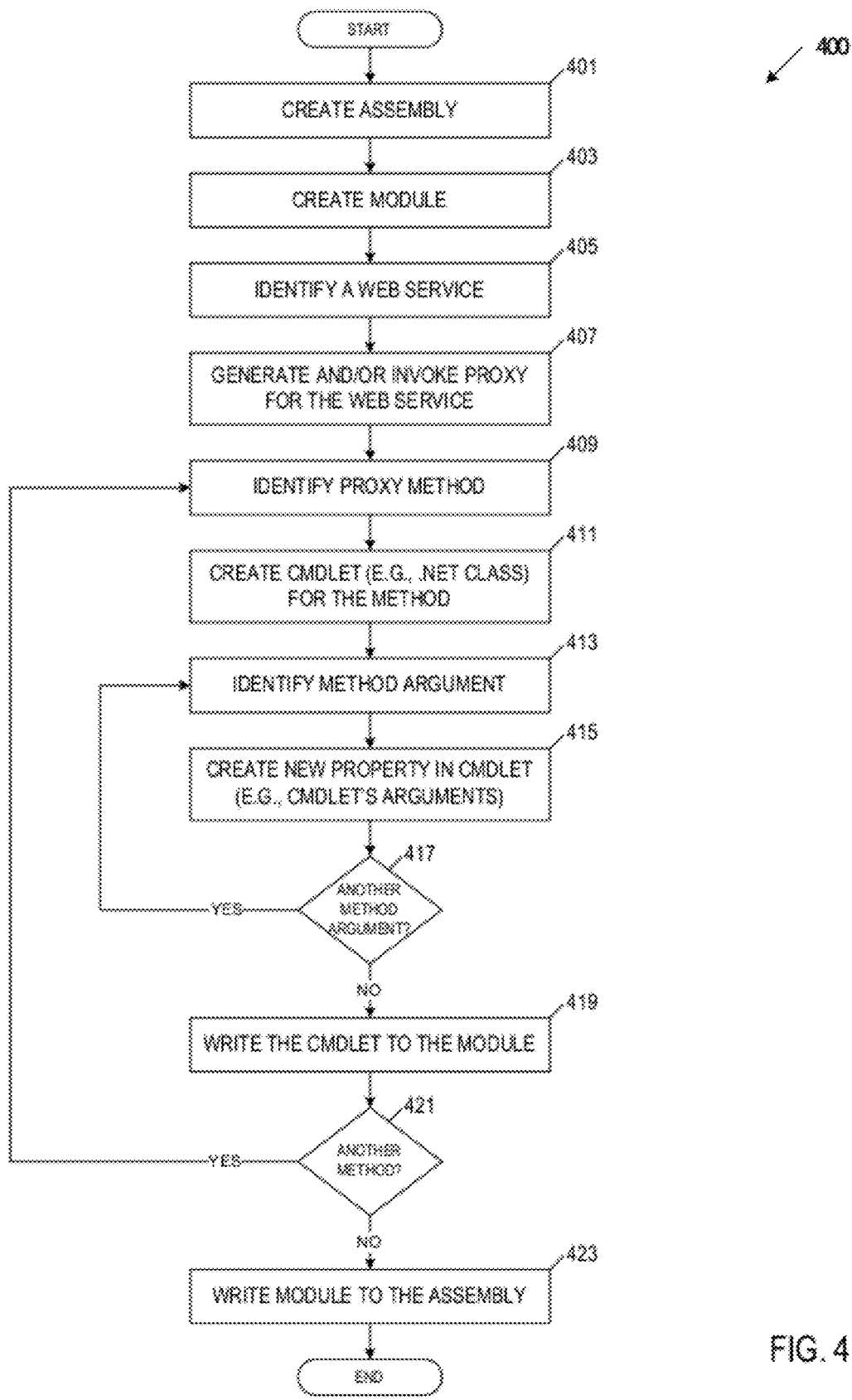
FIG. 4 is a flow diagram of an embodiment of a method for automatically generating object driven shell commands code (e.g., as cmdlets) to be executed in an object driven shell platform for communicating to a Web service.

FIG. 4 is a flow diagram of an embodiment of a method 400 for automatically creating object driven shell commands code (e.g., as cmdlets) that defines classes implementing Web service methods' parameters for a Web service. Method 400 can be performed by processing logic that can comprise hardware (e.g., circuitry, dedicated logic, programmable logic, microcode, etc.), software (e.g., instructions run on a processing device), or a combination thereof.

In one embodiment, the method 400 starts with the tool creating an assembly (e.g., .NET assembly) at block 401. The tool creates an empty dll file to be the assembly (e.g., snapin dll) for the Web service at block 401. Assemblies can contain one or more modules, which are logical collections of code within an assembly. At block 403, the tool generates an empty module.

At block 405, the tool identifies a Web service and creates and/or invokes proxy code (e.g., proxy dll) for the Web service at block 407. The tool can receive user input that identifies a Web service via a user interface. User input can include a URL that identifies the Web service and login credentials to allow the tool to connect and login to the Web service. In another embodiment, the tool can communicate with a UDDI registry and request the registry to identify a Web service provider. The UDDI registry can return the URL(s) for the server(s) that provide the particular Web service requested by the tool. At block 407, the tool can generate a proxy dll for the Web service and/or invoke a proxy dll that is already stored in a data store that is coupled to the tool.

Figure 6:
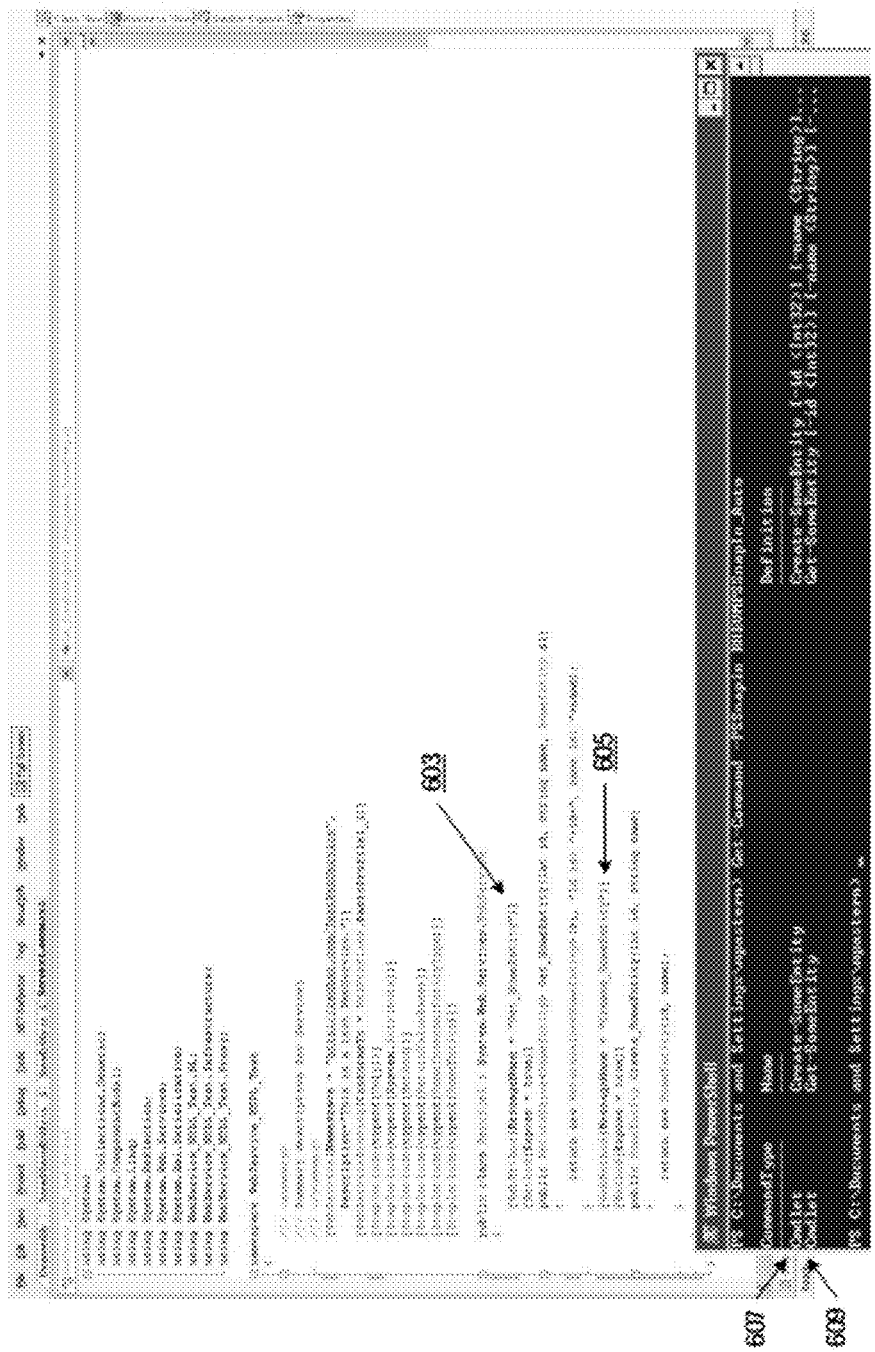
FIG. 6 illustrates exemplary cmdlets generated according to one embodiment of the invention.

The tool connects to the Web service via the proxy. The tool may connect to the Web service via the proxy using login credentials received at block 405. The client proxy contains a set of methods that point to the methods of the Web service and can communicate with the Web service for an exchange of information. At block 409, the tool identifies a method in the proxy and creates object driven shell commands code (cmdlets code), for example, as a cmdlet (.NET class) for the method at block 411. The object driven shell commands code (e.g., as a cmdlet) defines classes implementing the methods' parameters. The tool also includes code in the cmdlet code to point a cmdlet to an invocation infrastructure (e.g., invocation dll) at block 411. The invocation infrastructure is a program that can communicate with the Web service client proxy. FIG. 6 illustrates exemplary cmdlets generated according to one embodiment of the invention. For example, the tool identifies a Get_SomeEntity 603 method and creates a cmdlet 609 called Get-SomeEntity for the Get_SomeEntity 603 method.

Returning to FIG. 4, the client proxy also contains the arguments for the methods. At block 413, the tool identifies the method's arguments from the proxy. For example, the tool identifies an argument type and an argument name for the method. At block 415, the tool creates one or more new properties (e.g., cmdlet's arguments) in the cmdlet based on the method's argument type and name. A method can have one or more arguments. At block 417, the tool determines whether there is another argument for the method. If there is another argument for the method, the tool returns to block 409 to identify the argument. If there is not another argument for the method (block 417), the tool writes the cmdlet code to the module at block 419.

At block 421, the tool determines whether there is another method in the proxy. If there is another method, the tool returns to block 409 to identify the method. For example, in FIG. 6, the tool identifies another method Create_SomeEntity 605 and creates a cmdlet 607 called Create-SomeEntity for the Create_SomeEntity 605 method. Returning to FIG. 4, if there is not another method (block 421), the tool writes the module to the assembly (e.g., snapin dll) at block 423. The tool also generates Common Intermediate Language (CIL) (also known as Microsoft Intermediate Language or MSIL) for the assembly. The tool can use scripts and/or templates that are stored in the data store to generate the CIL instructions. Subsequently, the assembly (e.g., snapin dll) can be deployed in a PowerShell™ platform and executed in a PowerShell™ runtime.

For example, at block 405, the tool receives user input of a URL for a virtualization management Web service and the tool generates and/or invokes a virtualization management proxy dll to generate a client proxy for a virtualization management Web service at block 407. At block 409, the tool identifies a SelectVirtualMachine method from the proxy. The proxy may include additional methods, such as a StartVirtualMachine method, a StopVirtualMachine method, and a BackupVirtualMachine method.

At block 411, the tool creates a cmdlet for the SelectVirtualMachine method. For instance, the tool creates a cmdlet named select-vm cmdlet. At block 413, the tool identifies an argument for the SelectVirtualMachine method. For example, the SelectVirtualMachine method may have an argument called 'host' and is a string type. At block 415, the tool creates cmdlet arguments based on the method argument 'host' and string type. At block 417, the tool determines that the SelectVirtualMachine method has another argument called 'name' and is a string type, and the tool creates cmdlet arguments based on the argument 'name' and string type. The tool determines that the SelectVirtualMachine method does not have any more arguments and writes the cmdlet code for the select-vm cmdlet to the module at block 419.

At block 421, the tool determines that the proxy contains additional methods (e.g., StartVirtualMachine method, a StopVirtualMachine method, and a BackupVirtualMachine method), and returns to block 409 to identify another proxy method. The tool continues to create a start-vm cmdlet to correspond to the StartVirtualMachine method, a stop-vm cmdlet for the StopVirtualMachine method, and backup-vm cmdlet for the BackupVirtualMachine method.

When the tool has created code for cmdlets for all of the methods in the proxy, the tool writes the module to the assembly at block 423. The tool can create a single module that can store all of the cmdlets code for a Web service and can handle method overloads. A method overload occurs when a Web service has multiple methods that have the same name, but have different arguments. For example, a client proxy for a Web service contains multiple SelectVirtualMachine methods. One of the SelectVirtualMachine methods has parameter 'name' and another SelectVirtualMachine method has the parameter 'host'. The tool can create a single PowerShell™ cmdlet for the multiple SelectVirtualMachine methods that includes a superset of the parameters of the multiple methods. For instance, at blocks 411, 413, 415, the tool creates a single cmdlet called select-vm that contains the arguments 'name' and 'host.' The tool also supports mapping of different methods into a single command (e.g., cmdlet), which may be defined by the Web service.

Figure 7:
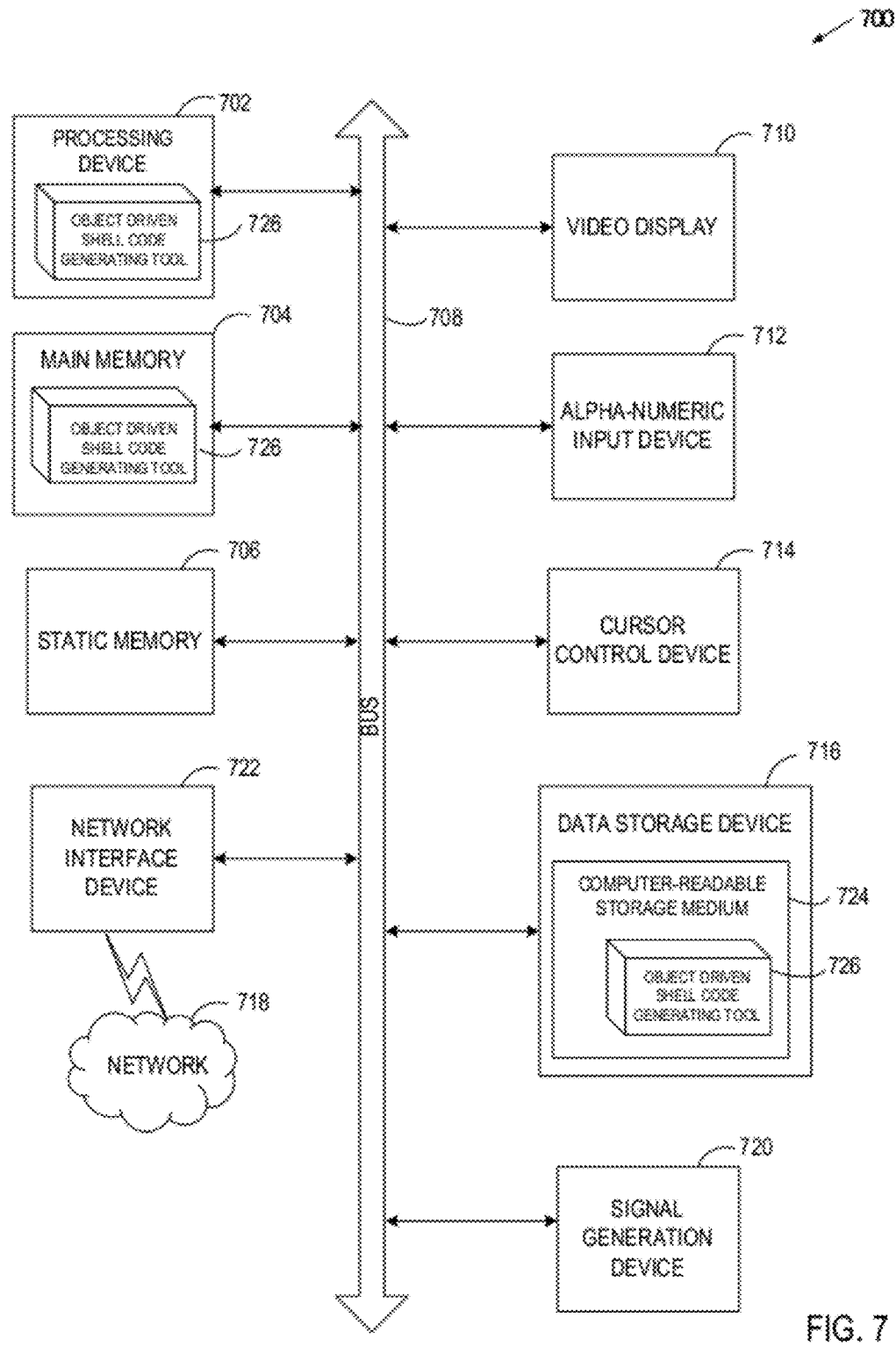
FIG. 7 is a diagram of one embodiment of a computer system for automatically generating proxy code, invocation infrastructure code, and object driven shell commands code (e.g, as cmdlets) to be executed in an object driven shell platform for communicating to a Web service.

FIG. 7 is a diagram of one embodiment of a computer system for automatically generating code to be executed in an object driven shell platform (e.g., PowerShell™ platform) for communicating to a Web service. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the object driven shell code generating tool 726 (object driven shell code tool) for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the object driven shell code generating tool 726) embodying any one or more of the methodologies or functions described herein. The object driven shell code generating tool 726 may also reside, completely or at least partially, within the main memory 704 and/or within the processing device 702 during execution thereof by the computer system 700, the main memory 704 and the processing device 702 also constituting machine-readable storage media. The object driven shell code generating tool 726 may further be transmitted or received over a network 718 via the network interface device 722.

The computer-readable storage medium 724 may also be used to store the object driven shell code generating tool 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The object driven shell code generating tool 726, components and other features described herein (for example in relation to FIG. 1) can be implemented as discrete hardware components or integrated in the functionality of hardware components such as ASICS, FPGAs, DSPs or similar devices. In addition, the an object driven shell code generating tool 726 can be implemented as firmware or functional circuitry within hardware devices. Further, the object driven shell code generating tool 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "creating," "executing," "generating," "installing," "accessing," "storing," "identifying," "pointing," "presenting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically generating code for communicating to a Web service. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device via a graphical interface tool, input data identifying a virtualization management web service hosted by a server, wherein the input data comprises a uniform resource locator (URL) and user logic credentials or a request to a UDDI registry;
   creating proxy code for the virtualization management web service and executing the proxy code to generate a service client proxy to identify a plurality of service methods for the virtualization management web service, the service client proxy comprising the plurality of service methods that invoke corresponding services at the server by encapsulating input and output parameters in a simple object access protocol (SOAP) message, wherein the service client proxy handles method overloads, wherein a method overload occurs when two or more of the plurality of service methods have the same name but different arguments, wherein the plurality of service methods comprises at least one of a method for selecting a virtual machine, a method for starting a virtual machine, a method for stopping a virtual machine, or a method for backing up a virtual machine;

creating, automatically by the processing device, object driven shell commands code for the plurality of service methods in the service client proxy, the object driven shell commands code defining classes comprising a verb-noun pattern for implementing parameters of the plurality of service methods, wherein the object driven shell commands code is to be executed in an object driven shell platform to invoke services at the server using the plurality of service methods in the service client proxy;

creating, automatically by the processing device, invocation infrastructure code for communicating to the plurality of service methods via the service client proxy; and deploying the proxy code, the invocation infrastructure code, and the object driven shell commands code in the object driven shell platform on a client, wherein execution of the proxy code, the invocation infrastructure code, and the object driven shell commands code in the object driven shell platform and invocation of an object driven shell command in the object driven shell platform calls one of the plurality of service methods via the invocation infrastructure and the service client proxy.

2. The method of claim 1, wherein the object driven shell commands code is cmdlets code.

3. The method of claim 1, wherein creating proxy code comprises:

automatically accessing description data for the virtualization management web service in response to receiving the data that identifies the virtualization management web service;

creating the proxy code to define the proxy for the virtualization management web service using the description data; and storing the proxy code in a data store.

4. The method of claim 1, wherein creating object driven shell commands code comprises:

identifying one of the plurality of service methods in the client proxy and one or more arguments for the service method;

creating the object driven shell commands code that defines the class implementing the parameters of the corresponding service method using the one or more arguments;

pointing the object driven shell commands code to invocation infrastructure code, wherein the invocation infrastructure code is used to communicate with the client proxy to communicate to a corresponding web service method on a remote server; and storing the object driven shell commands code in a module.

5. The method of claim 4, further comprising:

creating the module to contain object driven shell commands code for the plurality of service methods in the client proxy, wherein the object driven shell commands code comprises names that correspond to names of the plurality of service methods in the client proxy, and wherein the object driven shell commands code comprises a superset of parameters that comprises the parameters for the plurality of service methods comprising the corresponding names.

6. The method of claim 4, further comprising:

generating Common Intermediate Language (CIL) instructions for an assembly for the virtualization management web service; and storing the module and CIL instructions in the assembly.

7. A system comprising:

a memory to; and a processing device coupled to the memory to:

receive, via a graphical user interface tool, input data identifying a virtualization management web service hosted by a server, wherein the input data comprises a uniform resource locator (URL) and user login credentials or a request to a UDDI registry;

create proxy code for the virtualization management web service and execute the proxy code to generate a service client proxy to identify a plurality of service methods for the virtualization management webs service, the service client proxy comprising the plurality of service methods that invoke corresponding services at the server by encapsulating input and output parameters in a simple object access protocol (SOAP) message, wherein the service client proxy handles method overloads, wherein a method overload occurs when two or more of the plurality of service methods have the same name but different arguments, wherein the plurality of service methods comprises at least one of a method for selecting a virtual machine, a method for starting a virtual machine, a method for stopping a virtual machine, or a method for backing up a virtual machine;

create object driven shell commands code for the plurality of server methods, the object driven shell commands defining classes comprising a verb-noun pattern implementing parameters of the plurality of service methods, wherein the object driven shell commands code is to be executed in the object driven shell platform to invoke services at the servers using the plurality of service methods in the service client proxy;

create invocation infrastructure code for communicating to the plurality of service methods via the service client proxy; and deploy the proxy code, the invocation infrastructure code, and the object driven shell commands code in the object driven shell platform, wherein invocation of an object driven shell command in the object driven shell platform calls one of the plurality of service methods via the invocation infrastructure and the service client proxy.

8. The system of claim 7, wherein the object driven shell commands code is cmdlets code.

9. The system of claim 7, wherein creating proxy code comprises:

automatically accessing description data for the virtualization management web service in response to receiving the data that identifies the service;

creating the proxy code to define the proxy for the virtualization management web service using the description data; and storing the proxy code in memory.

10. The system of claim 7, wherein creating object driven shell commands code comprises:

identifying one of the plurality of service methods in the client proxy and one or more arguments for the service method;

creating the object driven shell commands code that defines the class implementing the parameters of the corresponding service method using the one or more arguments;

pointing the object driven shell commands code to invocation infrastructure code, wherein the invocation infrastructure code is used to communicate with the client proxy to communicate to a corresponding web service method on a remote server; and storing the object driven shell commands code in a module in memory.

11. The system of claim 10, wherein the processing device is further to:

create the module to contain object driven shell commands code for the plurality of service methods in the client proxy, wherein the object driven shell commands code comprises names that correspond to names of the plurality of service methods in the client proxy, and wherein the object driven shell commands code comprises a superset of parameters that comprises the parameters for the plurality of service methods comprising the corresponding names.

12. The system of claim 10, wherein the processing device is further to:

generate Common Intermediate Language (CIL) instructions for an assembly for the virtualization management web service; and store the module and CIL instructions in the assembly in the memory.

13. A non-transitory computer-readable medium having instructions encoded thereon that, when executed by a processing device, cause the processing device to perform operations comprising:

receiving, by the processing device via a graphical interface tool, input data identifying a virtualization management web service hosted by a server, wherein the input data comprises a uniform resource locator (URL) and user login credentials or a request to a UDDI registry;

creating proxy code for the virtualization management web service and executing the proxy code to generate a service client proxy to identify a plurality of service methods for the virtualization management web service, the service client proxy comprising the plurality of service methods that invoke corresponding services at the server by encapsulating input and output parameters in a simple object access protocol (SOAP) message, wherein the service client proxy handles method overloads, wherein a method overload occurs when two or more of the plurality of service methods have the same name but different arguments, wherein the plurality of service methods comprises at least one of a method for selecting a virtual machine, a method for starting a virtual machine, a method for stopping a virtual machine, and a method for backing up a virtual machine;

creating, automatically by the processing device, object driven shell commands code for the plurality of service methods in the service client proxy, the object driven shell commands code defining classes comprising a verb-noun pattern implementing parameters of the plurality of service methods, wherein the object driven shell commands code is to be executed in an object driven shell platform to invoke services at the server using the plurality of service methods in the service client proxy;

creating, automatically by the processing device, invocation infrastructure code for communicating to the plurality of service methods via the service client proxy; and deploying the proxy code, the invocation infrastructure code, and the object driven shell commands code in the object driven shell platform on a client, wherein execution of the proxy code, the invocation infrastructure code, and the object driven shell commands code in the object driven shell platform and invocation of an object driven shell command in the object driven shell platform calls one of the plurality of service methods via the invocation infrastructure and the service client proxy.

14. The non-transitory computer-readable medium of claim 13, wherein the object driven shell commands code is cmdlets code.

15. The non-transitory computer-readable storage medium of claim 13, wherein creating proxy code comprises:

automatically accessing description data for the virtualization management web service in response to receiving the data that identifies the virtualization management web service;

creating the proxy code to define the proxy for the virtualization management web service using the description data; and storing the proxy code in a data store.

16. The non-transitory computer-readable storage medium of claim 13, wherein creating object driven shell commands code comprises:

identifying one of the plurality of service methods in the client proxy and one or more arguments for the service method;

creating the object driven shell commands code that defines the class implementing the parameters of the corresponding service method using the one or more arguments;

pointing the object driven shell commands code to invocation infrastructure code, wherein the invocation infrastructure code is used to communicate with the client proxy to communicate to a corresponding web service method on a remote server; and storing the object driven shell commands code in a module.

17. The non-transitory computer-readable medium of claim 16, the operations further comprising:

creating the module to contain object driven shell commands code for the plurality of the service methods in the client proxy, wherein the object driven shell commands code comprises names that correspond to names of the plurality of service methods in the client proxy, and wherein the object driven shell commands code comprises a superset of parameters that comprises the parameters for the plurality of service methods comprising the corresponding names.

18. The non-transitory computer-readable medium of claim 16, the operations further comprising:

generating Common Intermediate Language (CIL) instructions for an assembly for the virtualization management web service; and storing the module and CIL instructions in the assembly.

* * * * *

UNITED STATES PATENT AND TRADEMARK OFFICE
CERTIFICATE OF CORRECTION

PATENT NO. : 8,694,956 B2  Page 1 of 1
APPLICATION NO. : 12/904423
DATED : April 8, 2014
INVENTOR(S) : Michael Pasternak It is certified that error appears in the above-identified patent and that said Letters Patent is hereby corrected as shown below:

In the Claims

In claim 7, column 16, line 12, delete "to";

In claim 15, column 18, line 20, delete "storage";

In claim 16, column 18, line 30, delete "storage".

Signed and Sealed this
Twenty-eighth Day of October, 2014

Michelle K. Lee
*Deputy Director of the United States Patent and Trademark Office*